United States Patent
Lim et al.

(10) Patent No.: US 8,762,721 B2
(45) Date of Patent: Jun. 24, 2014

(54) METHOD FOR GENERATING AUTHORIZATION KEY AND METHOD FOR NEGOTIATING AUTHORIZATION IN COMMUNICATION SYSTEM BASED ON FREQUENCY OVERLAY

(75) Inventors: Sun-Hwa Lim, Daejeon (KR); Sang Ho Lee, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 639 days.

(21) Appl. No.: 12/670,519

(22) PCT Filed: Jun. 12, 2008

(86) PCT No.: PCT/KR2008/003297
§ 371 (c)(1),
(2), (4) Date: Jan. 25, 2010

(87) PCT Pub. No.: WO2009/020281
PCT Pub. Date: Feb. 12, 2009

(65) Prior Publication Data
US 2010/0211786 A1    Aug. 19, 2010

(30) Foreign Application Priority Data

Aug. 7, 2007 (KR) .......................... 10-2007-0078970

(51) Int. Cl.
*H04W 12/04* (2009.01)
(52) U.S. Cl.
USPC .......................................... 713/169; 380/270
(58) Field of Classification Search
USPC .......................................... 713/169; 380/270
See application file for complete search history.

(56) References Cited

U.S. PATENT DOCUMENTS 7,263,357 B2 *   8/2007   Lee et al. .................. 455/432.1
2004/0203783 A1  10/2004  Wu et al.

(Continued)

FOREIGN PATENT DOCUMENTS

| EP | 1 439 667 A2 | 7/2004 |
| KR | 10-2006-0088806 A | 8/2006 |
| KR | 10-2006-0097572 A | 9/2006 |
| KR | 10-2006-0101234 A | 9/2006 |

(Continued)

OTHER PUBLICATIONS

Ai-Fen Sui et al., An Improved Authenticated Key Agreement Protocol with Perfect Forward Secrecy for Wireless Mobile Communication, Wireless Communications and Networking Conference, IEEE Communications Society/WCNC 2005, Mar. 13-17, 2005.

*Primary Examiner* — Matthew Smithers
(74) *Attorney, Agent, or Firm* — Jefferson IP Law, LLP (57) ABSTRACT

A method for a terminal including a first media access control (MAC) layer and a second MAC layer to create an authorization key includes performing a first network entry process to a base station through the first MAC layer, and performing a second network entry process for a frequency overlay to the base station through the second MAC layer. In this instance, the first network entry process includes acquiring a key for generating an authorization key through an authentication process according to an authentication method negotiated with the base station, and generating a first authorization key through the key for generating the authorization key. The second network entry process includes generating a second authorization key by using the key generated in the first network entry process for generating the authorization key.

12 Claims, 6 Drawing Sheets

(56) References Cited

U.S. PATENT DOCUMENTS

| | | |
|---|---|---|
| 2006/0023887 A1 | 2/2006 | Agrawal et al. |
| 2007/0210894 A1* | 9/2007 | Park et al. ............... 340/5.2 |
| 2007/0297611 A1* | 12/2007 | Yun et al. ............... 380/270 |
| 2009/0019284 A1* | 1/2009 | Cho et al. ............... 713/170 |
| 2009/0119509 A1 | 5/2009 | Cho et al. |

FOREIGN PATENT DOCUMENTS

| | | | | |
|---|---|---|---|---|
| KR | 10-2006-0126889 A | | 12/2006 | |
| WO | WO-2006-022469 | * | 2/2006 | ............... H04B 7/26 |
| WO | 2006/098552 A1 | | 9/2006 | |
| WO | WO2006098552 | * | 9/2006 | ............... H04L 9/32 |
| WO | 2007/021094 A1 | | 2/2007 | |

\* cited by examiner

| Type | Length | Value |
|---|---|---|
| 25.2 | 2 | Bit #0: RSA-based authorization at the initial network entry<br>Bit #1: EAP-based authorization at the initial network entry<br>Bit #2: Athorization EAP-based atthorization at the initial network entry<br>Bit #3: Reserved. Set to 0<br>Bit #4: RSA-based authorization at the-entry<br>Bit #5: EAP-based authorization at the-entry<br>Bit #6: Athorization EAP-based atthorization at re-entry<br>Bit #7: Reserved. Set to 0<br>Bit #8: Omit authorization at the second network entry for the frequency overlay<br>Bit #9 #15: Reserved. Set to 0 |

METHOD FOR GENERATING AUTHORIZATION KEY AND METHOD FOR NEGOTIATING AUTHORIZATION IN COMMUNICATION SYSTEM BASED ON FREQUENCY OVERLAY

TECHNICAL FIELD

The present invention relates to authorization of a communication system.

BACKGROUND ART

A communication system, for example the wireless broadband Internet system defined by the IEEE 802.16e, acquires uplink/downlink channels between a terminal and a base station and negotiates parameters. Also, the wireless broadband Internet system transmits and receives values including power between a terminal and a base station, time, frequency offset, basic connection identifier (CID), and primary CID through a ranging process. Since a physical (PHY) layer and a media access control (MAC) layer are provided to the terminal and the base station in the above-noted communication system, a network entry process for user authentication is performed once.

However, regarding recently researched communication systems, such as the wireless broadband Internet development system, a terminal can have two predetermined frequency bandwidths (e.g., 10 MHz frequency bandwidth) based on the frequency overlay having an independent base station identifier (BSID). The communication system needs the network entry process twice since the terminal and the base station respectively have two PHY layers and MAC layers. In this instance, when a user authorization process is performed each time a network entry processed is performed, key management for handover and authorization can be problematic.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for efficiently generating an authorization key when performing a network entry for frequency overlay.

Technical Solution

In one aspect of the present invention, a method for a terminal including a first media access control (MAC) layer and a second MAC layer to generate an authorization key includes: performing a first network entry process to a base station through the first MAC layer; and performing a second network entry process for a frequency overlay to the base station through the second MAC layer, wherein the performing the first network entry process includes acquiring a key for generating an authorization key through an authentication process according to an authentication method negotiated with the base station and generating a first authorization key through the key for generating the authorization key, and the performing the second network entry process includes generating a second authorization key by using the key for generating the authorization key.

In another aspect of the present invention, a method for an access control router to generate an authorization key, the access control router transmitting/receiving messages to/from a base station including a first media access control (MAC) layer and a second MAC layer, includes: generating a first authorization key for a terminal when the terminal performs a first network entry process through the first MAC layer of the base station; and generating a second authorization key of the terminal when the terminal performs a second network entry process for a frequency overlay through the second MAC layer of the base station, wherein the generating the first authorization key includes acquiring a key for generating an authorization key when the authentication process according to the authentication method between the terminal and the base station is successful and generating the first authorization key by using the key for generating the authorization key, and the generating the second authorization key includes generating the second authorization key by using the key for generating the authorization key.

In another aspect of the present invention, a method for a terminal to negotiate with a base station on an authorization method includes: transmitting a subscriber station basic capability request (SBC-REQ) message including an authorization policy support field to the base station so as to negotiate the authentication; and receiving a subscriber station basic capability response (SBC-RSP) message from the base station in response to the (SBC-REQ) message, and the authorization policy support field includes an authentication omission bit for omitting the authentication process according to the authentication method when performing a network entry for a frequency overlay.

Advantageous Effects

According to the exemplary embodiment of the present invention, the authorization process of the second network entry can be omitted by using a master key that is generated when performing a first network entry. Accordingly, the time for processing the second network entry is reduced, and a waste of radio resource is prevented by reducing a signaling overhead. Also, the terminal and the AAA server manage a pair of master keys (MSK and EMSK) to provide convenience of key sharing for handover and MIP signal authentication.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements.

In the specification, a terminal can be a portable subscriber station (PSS), a mobile terminal (MT), a subscriber station (SS), a mobile station (MS), user equipment (UE), and an access terminal (AT), and can include whole or partial functions of the mobile terminal, the subscriber station, the portable subscriber station, and the user equipment.

In the specification, a base station (BS) can represent an access point (AP), a radio access station (RAS), a nodeB (Node B), a base transceiver station (BTS), and a mobile multihop relay (MMR)-BS, and can include whole or partial functions of the access point, the radio access station, the nodeB, the base transceiver station, and the MMR-BS.

Figure 1:
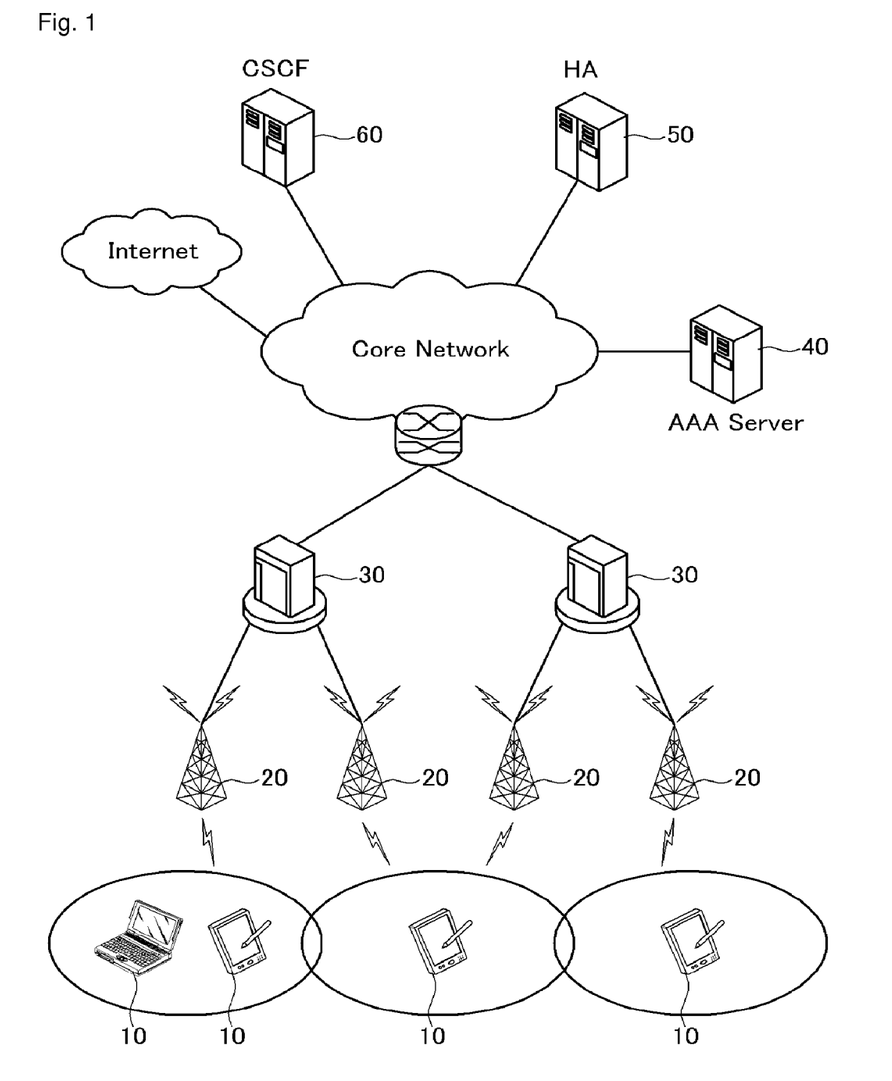
FIG. 1 is a configuration diagram of a communication system according to an exemplary embodiment of the present invention.

FIG. 1 is a configuration diagram of a communication system according to an exemplary embodiment of the present invention.

The communication system includes a terminal 10, a base station 20, and an access control router 30, and is connected to a wired Internet network. In this instance, the wired Internet network includes an authentication, authorization, accounting (AAA) server 40, a home agent (HA) 50, and a call state control function (CSCF) 60.

The terminal 10 and the base station 20 start communication to negotiate an authentication method for authenticating the terminal 10 through a subscriber station basic capability request (SBC-REQ) message and a subscriber station basic capability response (SBC-RSP) message, and then perform an authentication process. The authentication method according to the exemplary embodiment of the present invention is performed based on the EAP-based authentication process for performing equipment authentication or user authentication on the terminal 10 and the base station 20 by using a higher extensible authentication protocol (EAP) authentication protocol, and it supports the authentication function by using the cipher-based message authentication code (CMAC) method so as to perform a message authentication function, but the present invention is not limited thereto. In order to perform the authentication process, the terminal 10 generates a message for authentication and transmits the message to the base station 20, and the base station 20 authenticates the terminal 10 through an interaction with the AAA server 40 that is a corresponding authentication server.

The terminal 10 is connected to the base station 20 by performing a radio channel transmitting/receiving function and a MAC process function according to the radio access standard, and transmits/receives high-speed packet data to/from the connected base station 20.

The base station 20 receives a radio signal from the terminal 10 and transmits it to the access control router 30, and converts information transmitted by the access control router 30 into a radio signal and transmits it to the terminal 10. The access control router 30 is connected to the base station 20 and the portable Internet core network to perform an authentication function and a mobile IP (MIP) and quality of service (QoS) control function.

The AAA server 40 authenticates the subscriber station 10, authenticates the user, and verifies the service rights, and the home agent (HA) 50 performs a mobile IP (MIP) service function.

The CSCF 60 performs an IP multimedia subsystem (IMS) registration function and a call setting function so as to support the IP multimedia service.

Figure 2:
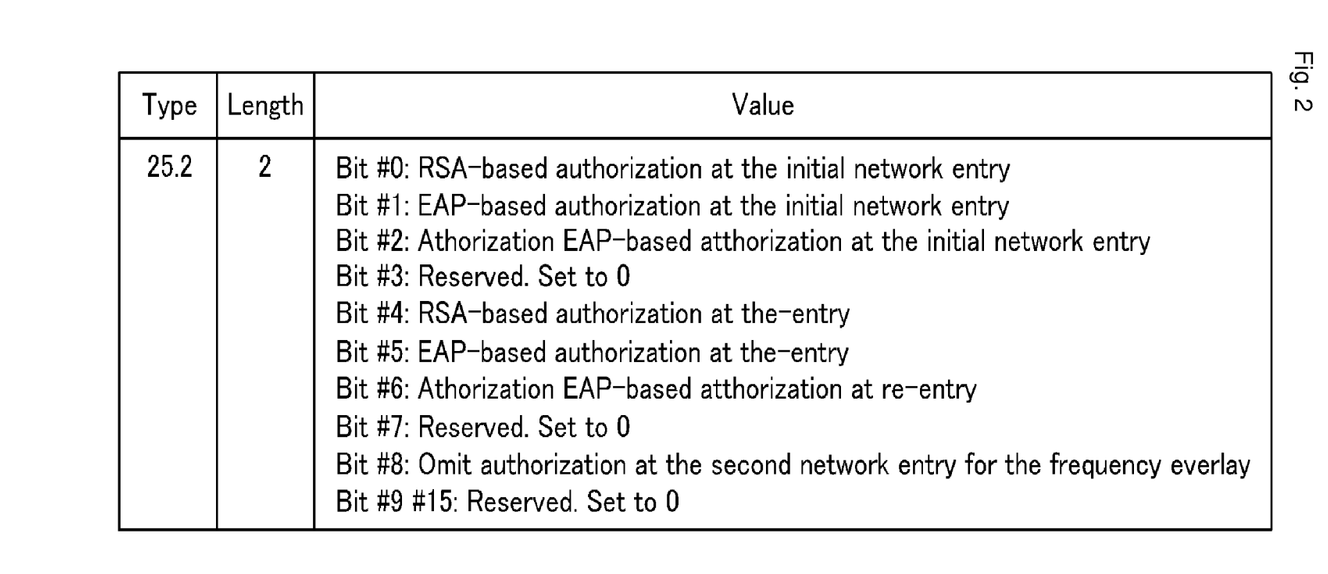
FIG. 2 is a table for an authorization policy support field structure of a message according to an exemplary embodiment of the present invention.

FIG. 2 is a table for an authorization policy support field structure of a message according to an exemplary embodiment of the present invention.

As shown in FIG. 2, an authorization policy support field included in the subscriber station basic capability request (SBC-REQ) message is used for supporting authentication negotiation for a frequency overlay between a terminal and a base station, and its type is determined to be 25.2. The length of the authorization policy support field according to an exemplary embodiment of the present invention is controlled to be 2 bytes which is greater than 1 byte that is defined by the IEEE 802.16e standard.

The bits from the $0^{th}$ bit (Bit #0) to the $2^{nd}$ bit (Bit #2) in the 2 bytes of the authorization policy support field are valid bits when the terminal's first network entry is performed. That is, the terminal performing the first network entry sets the supportable authorization policies to be 1 and the unsupportable authorization policies to be 0 in the authentication process of the initial access process through the lower 3 bits (Bit #0 to Bit #2) of the authorization policy support field. In this instance, the $0^{th}$ bit (Bit #0) can be allocated to the Rivest Shamir Adleman (RSA)-based authentication, the $1^{st}$ bit (Bit #1) to the EAP-based authentication, and the $2^{nd}$ bit (Bit #2) to the authenticated EAP-based authentication.

The bits from the $4^{th}$ bit (Bit #4) to the $6^{th}$ bit (Bit #6) are bits that are valid for the terminal's system re-access process or handover process while performing the first network entry. That is, the terminal in the re-access process when performing a first network entry or in the authentication process when performing a handover process sets the authorization policies to be 1 that are supportable in the authentication process of the handover process while performing the re-access process through the upper 3 bits (Bit #4 to Bit #6) of the authorization policy support field, and sets the unsupportable authorization policies to be 0. In this instance, the $4^{th}$ bit (Bit #4) can be allocated to the RAS-based authentication during the re-access process or the handover process, the $5^{th}$ bit (Bit #5) to the EAP-based authentication during the re-access process or the handover process, and the $6^{th}$ bit (Bit #6) to the authenticated EAP-based authentication during the re-access process or the handover process.

The $8^{th}$ bit (Bit #8) is a bit that is used for omitting authentication between the terminal and the AAA server when performing a second network entry for a frequency overlay. The $3^{rd}$ bit (Bit #3), the $7^{th}$ bit (Bit #7) and the $9^{th}$ bit (Bit #9) to the $15^{th}$ bit (Bit #15) are not used and are set to be 0.

An authorization key hierarchical structure generated by a terminal, a base station, an access control router, and an AAA server will now be described with reference to FIG. 3 and FIG. 4.

Figure 3:
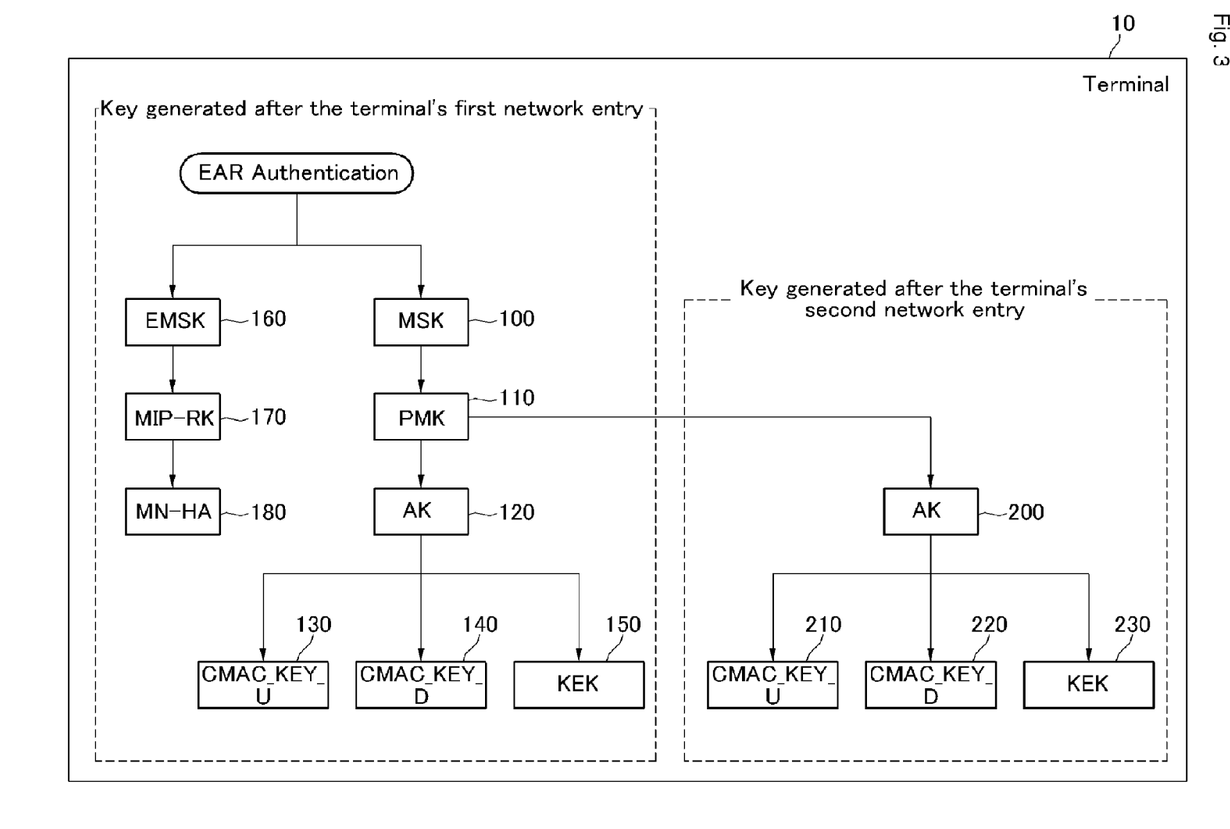
FIG. 3 shows a hierarchical structure of an authorization key generated by a terminal according to an exemplary embodiment of the present invention.
Figure 4:
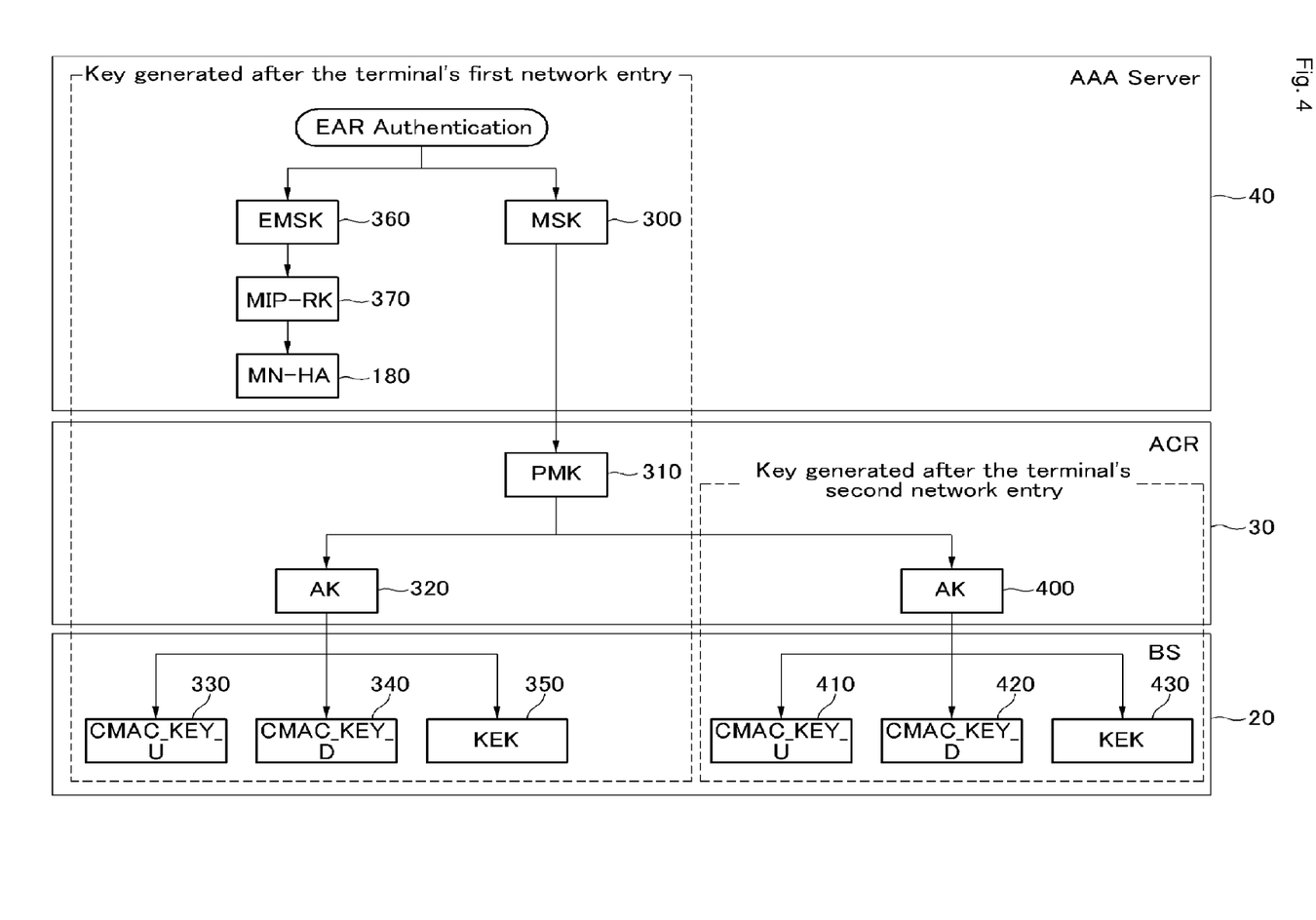
FIG. 4 shows a hierarchical structure of an authorization key generated by an AAA server, an access control router, and a base station according to an exemplary embodiment of the present invention.

FIG. 3 and FIG. 4 show hierarchical structures of an authorization key (AK) used for the radio section, and an authorization key used for the MIP signal. An algorithm for generating an authorization key used for the radio section will be described based on the IEEE 802.16e standard, and an algorithm for generating an authorization key used for the MIPv6 signal will be described based on the world interoperability for microwave access (WiMAX) standard.

The terminal and the base station according to the exemplary embodiment of the present invention have two MAC layers, and hence the network entry process for user authentication is performed twice.

FIG. 3 shows a hierarchical structure of an authorization key generated by a terminal according to an exemplary embodiment of the present invention.

As shown in FIG. 3, the EAP-based authentication process is successfully performed after the first network entry by the terminal 10, and the terminal 10 generates a pair of a master session key (MSK) and an extended master session key (EMSK) that are master keys for generating the authorization key (AK) (100 and 160). In this instance, the MSK is used to generate an authorization key to be used for the radio section between the terminal 10 and the base station 20, and the EMSK is used for authenticating the MIPv6 signal message.

The terminal 10 generates a pairwise master key (PMK) that is a basic key so as to generate an authorization key used for the radio section from the MSK (110), and generates an authorization key (AK) by using the "Dot16KDF (Dot16 Key Derivation Function)" that is a key generation algorithm defined by the IEEE 802.16e (120). The terminal 10 generates an upward message authorization key (CMAC_KEY_U), a downward message authorization key (CMAC_KEY_D), and a key encryption key from the generated authorization key (AK) (130, 140, and 150). In this instance, the CMAC_KEY_U is a key used for authenticating the signaling message to be transmitted to the base station 20 by the terminal 10, and the CMAC_KEY_D is a key used for authenticating the signaling message to be transmitted to the terminal 10 by the base station 20. The key encryption key (KEK) is a key used for encrypting a traffic encryption key (TEK) when the base station 20 transmits the TEK to the terminal 10. In this instance, the traffic encryption key (TEK) is used for encrypting the data traffic between the terminal 10 and the base station 20.

After the second network entry by the terminal 10, the terminal 10 generates a new AK by using the PMK that is a basic key generated when performing the first network entry (200). The terminal 10 generates a CMAC_KEY_U, a CMAC_KEY_D, and a KEK from the new AK (210, 220, and 230).

Also, the terminal 10 generates a mobile IP-root key (MIP-RK) from the EMSK so as to authenticate the MIPv6 signal (160 and 170), and generates a mobile node-home agent (MN-HA) from the generated MIP_RK (180).

FIG. 4 shows a hierarchical structure of an authorization key generated by an AAA server, an access control router, and a base station according to an exemplary embodiment of the present invention.

As shown in FIG. 4, when the terminal 10 successfully performs the EAP-based authentication process while performing the first network entry, the AAA server 40 generates a master session key (MSK) and an extended master session key (EMSK) that are a pair of master keys for generating the AK (300 and 360). In this instance, when the authentication method is the RSA-based authentication, the master key can be a pre-primary authorization key (pre-PAK).

The AAA server 40 distributes the MSK to the access control router so as to generate an authorization key to be used for the radio section. The access control router 30 generates a PMK that is a basic key from the MSK (310), and generates an AK by using the Dot16KDF 320 defined in the IEEE 802.16e. In this instance, when the authentication method is the RSA-based authentication, the basic key can be a primary authorization key (PAK). The base station 20 generates a CMAC_KEY_U, a CMAC_KEY_D, and a KEK from the generated AK (330, 340, and 350).

After the second network entry by the terminal 10, the access control router 30 generates a new authorization key (AK) by using the PMK that is generated when performing the first network entry (400). The base station 20 generates a CMAC_KEY_U, a CMAC_KEY_D, and a KEK by using the AK acquired from the access control router 30 (410, 420, and 430).

Also, the AAA server 40 generates a mobile IP-root key (MIP-RK) from the EMSK so as to authenticate the MIPv6 signal (370), and generates a MN-HA from the generated MIP_RK (380).

A network entry process between a terminal and a base station according to an exemplary embodiment of the present invention will now be described with reference to FIG. 5 and FIG. 6.

Figure 5:
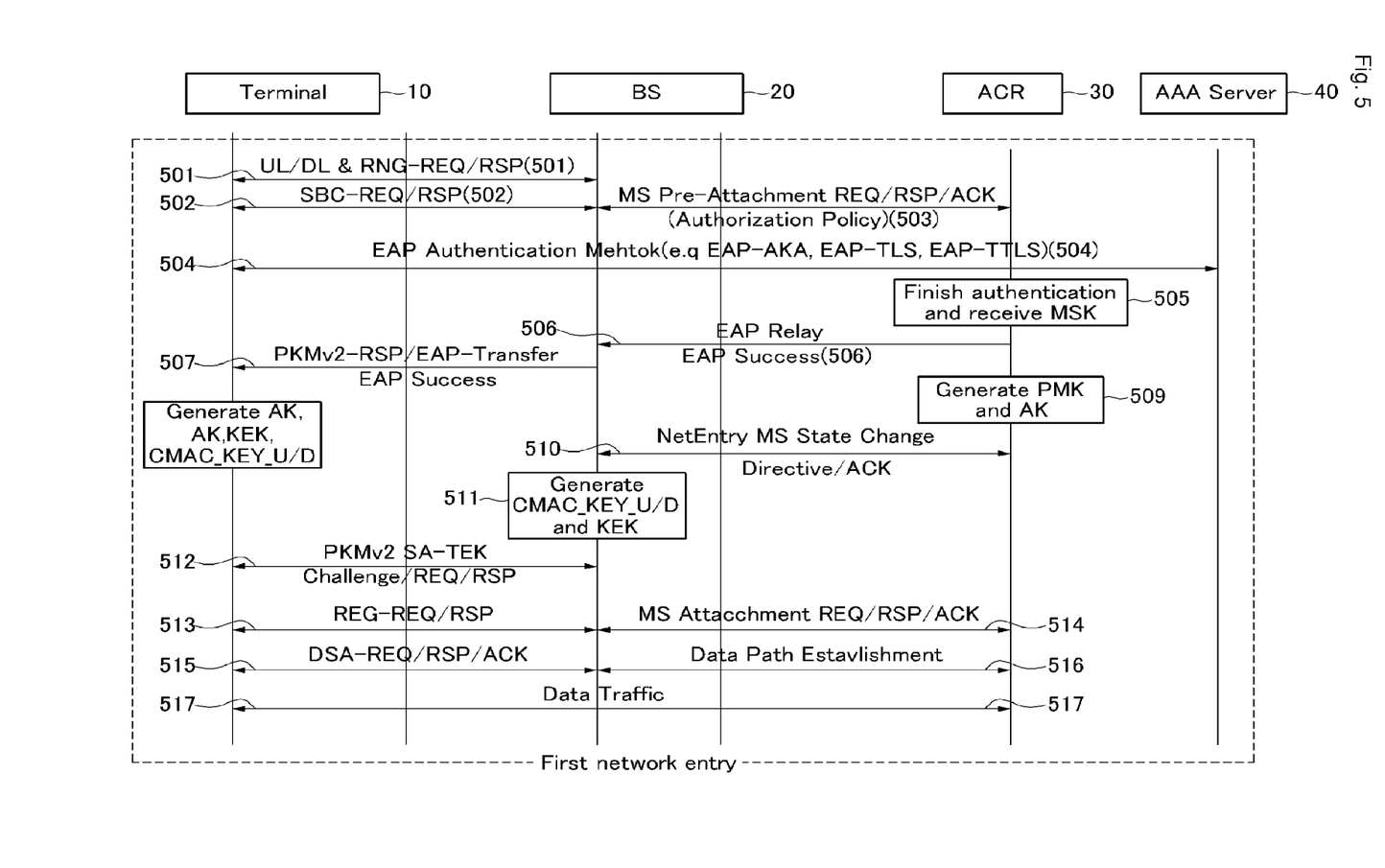
FIG. 5 shows a network entry process in a first physical/MAC layer 1 between a terminal and a base station according to an exemplary embodiment of the present invention.
Figure 6:
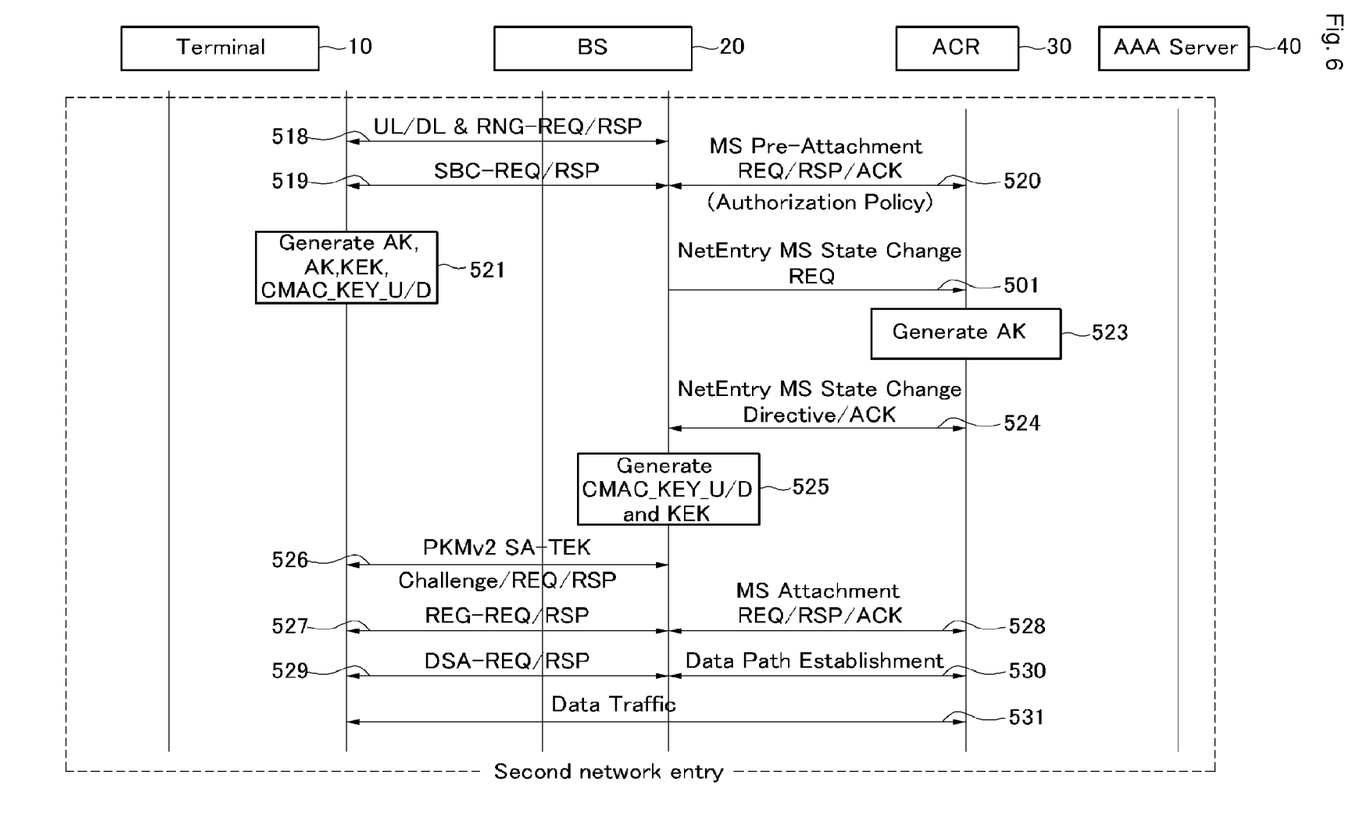
FIG. 6 shows a network entry process in a second physical/MAC layer 2 between a terminal and a base station according to an exemplary embodiment of the present invention.

The terminal 10 and the base station 20 in FIG. 5 and FIG. 6 transmit/receive the EAP-based authentication protocol message by using a privacy key management version 2 (PKMv2) that is one of media access control (MAC) layer messages defined in the IEEE 802.16e. The base station 20 and the access control router 30 transmit/receive the EAP-based authentication protocol message by using the R6 protocol defined by the WiMAX standard. The access control router 30 and the AAA server 40 transmit/receive the EAP-based authentication protocol message by using the diameter or radius protocol. In this instance, the terminal 10 and the base station 20 have two of a physical layer and MAC layer, and the network entry process is performed for each physical/MAC layer.

FIG. 5 shows a network entry process in a first physical/MAC layer 1 between a terminal and a base station according to an exemplary embodiment of the present invention.

As shown in FIG. 5, an uplink/downlink channel acquiring and ranging-request/response (RNG-REQ/RSP) process between the terminal 10 and the base station 20 is performed (501). When the initial access process between the terminal 10 and the base station 20 is finished, a subscriber station basic capability negotiation (SBC) process including an authentication mode negotiation process for authenticating the terminal 10 is performed. That is, when the terminal 10 transmits a SBC-REQ message to the base station 20 so as to negotiate the parameters including authorization policy, PKM protocol, and message authorization code mode, the base station 20 negotiates the parameters and transmits an SBC-RSP message to the terminal 10 (502). In this instance, the SBC-REQ/RSP message includes parameters of supportable authorization modes so as to select the authorization mode.

The base station 20 transmits a mobile station (MS) pre-attachment REQ message to the access control router 30 so as to transmit authorization policy information thereto. The access control router 30 generates an AK context for the terminal 10, and transmits an MS pre-attachment RSP message to the base station. The access control router 30 receives an MS pre-attachment acknowledgment (ACK) message from the base station 20 (503). The terminal 10 and the access control router 30 checks the executable authorization mode through the authorization mode negotiation parameter included in the SBC message, and select an authorization mode. For example, as described in FIG. 2, one of the RSA-based authentication mode, the EAP-based authentication mode, and the authenticated EAP-based authentication mode can be selected. The exemplary embodiment of the present invention will be described with the assumption that the EAP-based authentication mode is selected. The terminal 10 and the AAA server 40 transmit/receive an EAP authentication message through the base station 20 and the access control router 30 (504).

The access control router 30 receives a user authentication success and an MSK from the AAA server 40 (505), includes an EAP success to the EAP relay message therein, and transmits the message to the base station 20 (506). The base station 20 includes the EAP success in the PKMv2-RSP/EAP-transfer message, and transmits the message to the terminal 10 (507). The terminal 10 generates an AK, a CMAC_KEY_U, a CMAC_KEY_D, and a KEK by using the MSK (508).

In this instance, the access control router 30 generates a PMK and an AK by using the MSK received from the AAA server 40 (509). The access control router 30 includes the AK context in a NetEntry MS state change directive message and transmits the message to the base station 20, and the base station 20 transmits a NetEntry MS state change acknowledgement (ACK) message to the access control router 30 (510). The base station 20 generates a CMAC_KEY_U, a CMAC_KEY_D, and a KEK by using the AK (511).

The base station 20 transmits a PKMv2 SA-TEK challenge message to the terminal 10 so as to negotiate security association (SA) and transmit the TEK. The terminal 10 transmits a PKMv2 SA-TEK REQ message to the base station 20 in response to the PKMv2 SA-TEK challenge message. In this instance, the base station 20 successfully performing the PKMv2 SA-TEK REQ message transmits a PKMv2 SA-TEK RSP message to the terminal 10 (512). The terminal 10 transmits a register request (REG-REQ) message to the base station 20 so as to perform a registration process. In this instance, the base station 20 transmits a register response (REG-RSP) message to the terminal 10 when successfully performing registration on the terminal 10 (513). The base station 20 transmits an MS attachment REQ message to the access control router 30 so as to perform a process for registering the terminal 10 to the access control router 30. The access control router 30 transmits an MS attachment RSP message to the base station 20, and receives an MS attachment ACK message from the base station 20 (514).

The terminal 10 transmits a dynamic service addition (DSA) REQ message to the base station 20 so as to set a channel for a service connection including IP address allocation and user traffic transmission between the terminal 10 and the base station 20. The base station 20 transmits a DSA RSP message to the terminal 10, and the terminal 10 transmits a DSA ACK message to the base station 20 (515). The base station 20 and the access control router 30 perform a data path establishment message process (516). Then, data traffic is transmitted through the terminal 10, the base station 20, and the access control router 30 (517).

FIG. 6 shows a network entry process in a second physical/MAC layer 2 between a terminal and a base station according to an exemplary embodiment of the present invention.

As shown in FIG. 6, in the second network entry process, the authentication process between the terminal 10 and the AAA server 40 is omitted. That is, an authorization key to be used in the second network entry process is generated by using the PMK generated in the first network entry process.

The uplink/downlink channel acquiring and RNG-REQ/RSP process is performed between the terminal 10 and the base station 20 (518) in a like manner of the first network entry process. When the initial access process between the terminal 10 and the base station 20 is finished, the SBC process is performed. That is, the terminal 10 transmits the SBC-REQ message to the base station 20 so as to negotiate the parameters including an authorization policy, a PKM protocol, and a message authorization code mode, and the base station 20 transmits the SBC-RSP message to the terminal 10 after negotiating the parameters. In this instance, the SBC-REQ/RSP message used in the second network entry for a frequency overlay includes an authentication omission bit for omitting the authentication process between the terminal 10 and the AAA server 40 (519).

The base station 20 transmits an MS pre-attachment REQ message to the access control router 30 so as to transmit authorization policy information thereto. The access control router 30 generates an AK context for the terminal 10, and transmits an MS pre-attachment RSP message to the base station. The access control router 30 receives an MS pre-attachment ACK message from the base station 20 (520).

The terminal 10 generates an AK, a CMAC_KEY_U, a CMAC_KEY_D, and a KEK by using the PMK generated in the first network entry process (521). The base station 20 transmits a NetEntry MS state change REQ message to the access control router 30 so as to receive the AK context (522). In this instance, when receiving the NetEntry MS state change REQ message, the access control router 30 generates an AK and an AK context by using the PMK generated in the first network entry process (523). The access control router 30 includes the AK context in the NetEntry MS state change directive message and transmits the message to the base station 20, and the base station 20 transmits a NetEntry MS state change ACK message to the access control router 30 (524). The base station 20 generates a CMAC_KEY_U, a CMAC_KEY_D, and a KEK by using the AK (525).

The base station 20 transmits a PKMv2 SA-TEK challenge message to the terminal 10 so as to perform security association (SA) and transmit the TEK. The terminal 10 transmits a PKMv2 SA-TEK REQ message to the base station 20 in response to the PKMv2 SA-TEK challenge message. In this instance, the base station 20 having successfully performed the PKMv2 SA-TEK REQ message transmits a PKMv2 SA-TEK RSP message to the terminal 10 (526). The terminal 10 transmits a REG-REQ message to the base station 20 so as to perform a registration process. In this instance, when having successfully registered the terminal 10, the base station 20 transmits a REG-RSP message to the terminal 10 (527). The base station 20 transmits an MS attachment REQ message to the access control router 30 so as to perform a process for registering the terminal 10 to the access control router 30. The access control router 30 transmits an MS attachment RSP message to the base station 20, and receives an MS attachment ACK message from the base station 20 (528).

The terminal 10 transmits a dynamic service addition (DSA) REQ message to the base station 20 so as to set the channel for service connection including IP address allocation and user traffic transmission between the terminal 10 and the base station 20. The base station 20 transmits a DSA RSP message to the terminal 10, and the terminal 10 transmits a DSA ACK message to the base station 20 (529). The base station 20 and the access control router 30 perform a data path establishment message process 530. Then, data traffic is transmitted through the terminal 10, the base station 20, and the access control router 30 (531).

In the exemplary embodiment of the present invention, the PMK is used as a key for generating an authorization key when performing a network entry process for a frequency overlay. That is, when performing the network entry process, the terminal and the access control router generate a PMK from the MSK that is generated when performing the first network entry process, and then generates an authorization key by using the PMK.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for a terminal including a first physical (PHY)/media access control (MAC) layer and a second PHY/MAC layer to generate an authorization key, the method comprising:
performing a first network entry process to a base station through the first PHY/MAC layer; and
performing a second network entry process in a frequency overlay to the base station through the second PHY/MAC layer,
wherein the second PHY/MAC layer comprises the frequency overlay with regard to the first PHY/MAC layer,
wherein the performing of the first network entry process includes acquiring a key for generating an authorization key through an authentication process according to an authentication method negotiated with the base station, and generating a first authorization key through the key for generating the authorization key, and
wherein the performing of the second network entry process in the frequency overlay includes generating a second authorization key by using the key, which is acquired through the authentication process in the performing of the first network entry process, without performing further authentication process.

2. The method of claim 1, wherein:
the acquiring includes acquiring a master key through an authentication process according to the authentication method negotiated with the base station; and
the performing the first network entry process further includes generating a basic key (PMK) by using the master key, and the key for generating the authorization key is the basic key (PMK).

3. The method of claim 1, wherein:
the acquiring includes acquiring a master key corresponding to the key for generating the authorization key through the authentication process according to the authentication method negotiated with the base station;
the performing the first network entry process includes generating a basic key (PMK) by using the master key and generating the first authorization key through the basic key (PMK); and
the performing the second network entry process includes generating the basic key (PMK) by using the master key and generating the second authorization key by using the basic key (PMK).

4. The method of claim 1, wherein the performing the first network entry process further includes:
transmitting a first request message indicating the authentication method supported by the terminal to the base station; and
receiving a response message indicating the authentication method selected according to the first request message from the base station.

5. The method of claim 1, wherein the performing the second network entry process further includes:
transmitting a second request message including an authentication omission bit for omitting the authentication process according to the authentication method to the base station; and
receiving a response message caused by the second request message from the base station.

6. The method of claim 5, wherein the authentication method is extensible authentication protocol (EAP)-based authentication, and
the master key is a master session key (MSK) and the basic key is a pairwise master key (PMK).

7. A method for an access control router to generate an authorization key, the access control router transmitting/receiving messages to/from a base station including a first physical (PHY)/media access control (MAC) layer and a second PHY/MAC layer, the method comprising:
generating a first authorization key for a terminal when the terminal performs a first network entry process through the first PHY/MAC layer of the base station; and
generating a second authorization key of the terminal when the terminal performs a second network entry process in a frequency overlay through the second PHY/MAC layer of the base station, wherein
the second PHY/MAC layer comprises the frequency overlay with regard to the first PHY/MAC layer,
the generating the first authorization key includes acquiring a key for generating an authorization key when the authentication process according to the authentication method between the terminal and the base station is successful, and generating the first authorization key by using the key for generating the authorization key, and
the generating the second authorization key includes generating the second authorization key by using the key, which is acquired through the authentication process in the performing of the first network entry process, without performing further authentication process.

8. The method of claim 7, wherein:
the acquiring includes acquiring a master key when the authentication process according to the authentication method between the terminal and the base station is successful; and
the generating the first authorization key further includes generating a basic key (pairwise master key) by using the master key, and the key for generating the authorization key is the basic key (PMK).

9. The method of claim 7, wherein:
the acquiring includes acquiring a master key corresponding to the key for generating the authorization key when the authentication process according to the authentication method between the terminal and the base station is successful;
the generating the first authorization key further includes generating a basic key (PMK) by using the master key and generating the first authorization key through the basic key (PMK); and
the generating the second authorization key includes generating the basic key (PMK) by using the master key and generating the second authorization key through the basic key (PMK).

10. The method of claim 7, wherein the authentication method is based on extensible authentication protocol (EAP)-based authentication, and the master key is a master session key (MSK) and the basic key is a pairwise master key (PMK).

11. A method for a terminal to negotiate with a base station on an authorization method, the method comprising:

transmitting a subscriber station basic capability request (SBC-REQ) message including an authorization policy support field to the base station so as to negotiate the authentication; and receiving a subscriber station basic capability response (SBC-RSP) message from the base station in response to the (SBC-REQ) message, wherein the authorization policy support field includes an authentication omission bit for omitting the authentication process according to the authentication method only when performing a network entry in a frequency overlay.

12. The method of claim 11, wherein the authorization policy support field further includes a bit for indicating a support state of the EAP-based authentication method.

* * * * *